Oct. 29, 1968 C. A. SECKERSON ET AL 3,407,909
INFINITELY VARIABLE HYDRAULIC CLAMPING MECHANISM
Filed July 13, 1966 2 Sheets-Sheet 1

Inventors:
Clifford A. Seckerson &
Charles E. Downer.
by Philip E. Parker Atty.

Oct. 29, 1968  C. A. SECKERSON ET AL  3,407,909
INFINITELY VARIABLE HYDRAULIC CLAMPING MECHANISM
Filed July 13, 1966  2 Sheets-Sheet 2
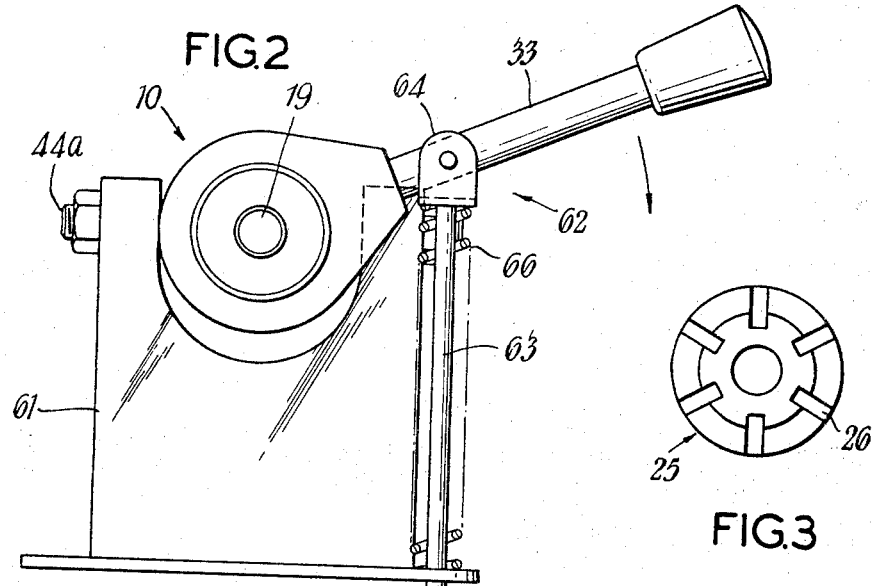
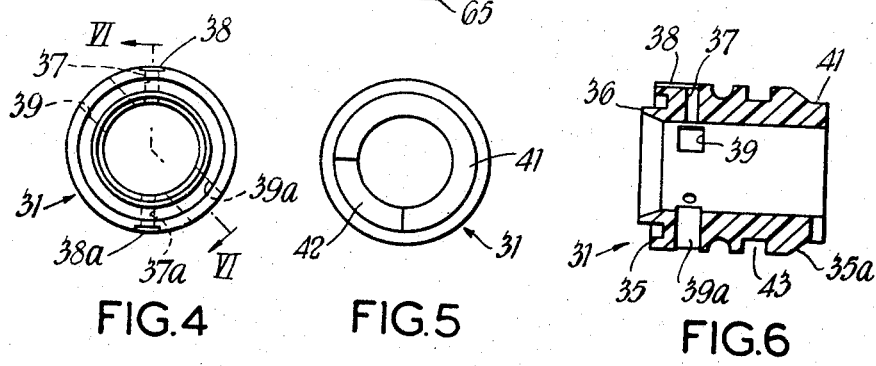
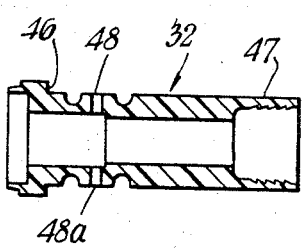
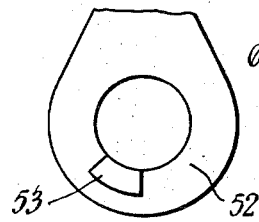
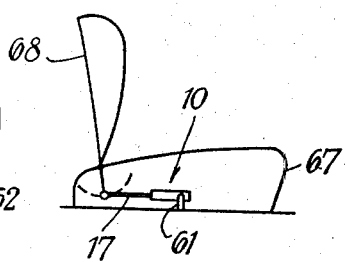
Inventors:
Clifford A. Seckerson &
Charles E. Downer.
by Philip E. Parker Atty.

United States Patent Office 3,407,909
Patented Oct. 29, 1968

3,407,909
INFINITELY VARIABLE HYDRAULIC CLAMPING MECHANISM
Clifford A. Seckerson, Iver Heath, and Charles E. Downer, Ruislip, England, assignors to United-Carr Incorporated, Boston, Mass., a corporation of Delaware
Filed July 13, 1966, Ser. No. 564,790
Claims priority, application Great Britain, July 20, 1965, 30,841/65
4 Claims. (Cl. 188—97)

ABSTRACT OF THE DISCLOSURE

The invention is a locking device for selectively positioning a piston member in a cylinder containing a fluid. Chamber means are formed on opposite sides of the piston with valve-controlled conduit means connecting said chamber means. The valve is comprised of relatively rotatable sleeves which allow fluid to pass from one chamber to another in a first position of the sleeves and prevent fluid communication between said chambers in a second position of the sleeves to lock said piston in a predetermined location.

---

Figure 1:
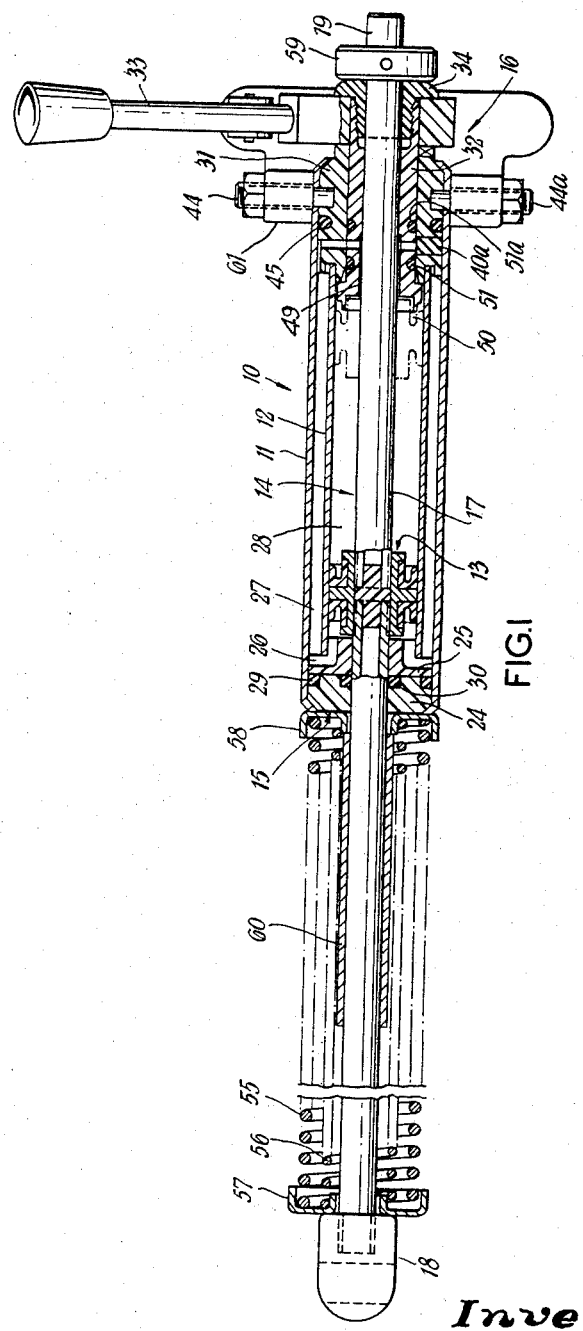

The present invention relates to a locking device which comprises a piston and cylinder assembly and which is particularly but not exclusively suitable for providing infinitely variable adjustment of the angle of inclination of the back of a vehicle seat.

It is an object of the present invention to provide a hydraulic piston and cylinder assembly which can be locked in any desired position with the minimum of effort so as to lock the position of a member connected to the piston.

It is a further object of the invention to provide a hydraulic assembly which can be easily locked and unlocked and which, when locked, is subject to a minimal amount of play under high compressive forces.

It is yet a further object of the invention to provide a hydraulic locking device which is particularly adapted for controlling the inclination of the back of a vehicle seat and which automatically locks the back of the seat in position and is manually releasable.

According to the invention, there is provided a locking device in the form of a piston and cylinder assembly comprising a cylinder which is closed at both ends, a piston mounted on a shaft which extends through the length of the cylinder, the piston being slidable within the cylinder and dividing the cylinder into a first fluid chamber located on one side of the piston and a second fluid chamber located on the other side of the piston, a fluid conduit communicating between the first and second chambers, a valve operable to close and open the said fluid conduit so as to control movement of the piston along the cylinder, the valve being spaced axially from the piston, and a valve actuating member located externally of the piston shaft and mounted for rotation about the axis of the piston shaft to open and close the fluid conduit communicating between the first and second fluid chambers.

A preferred form of the invention will now be described with reference to the accompanying drawings, in which:

FIGURE 1 is a section through a locking device according to the present invention, FIGURE 2 is an end view of the locking device of FIGURE 1 showing a valve return mechanism, FIGURE 3 is an end view of a part of the end cap assembly of the device of FIGURE 1, FIGURES 4, 5 and 6 are respectively opposite end views and an elevation in section of a part of the valve mechanism of the device of FIGURE 1, FIGURE 7 is an elevation in section of a further part of the valve mechanism, FIGURE 8 is an elevation of the actuating lever of the valve mechanism and, FIGURE 9 is a diagrammatic view of a vehicle seat incorporating the locking device of FIGURES 1 and 2.

In FIGURE 1 a hydraulic locking device is indicated generally at 10.

The device 10 comprises an outer cylinder 11, a coaxial inner cylinder 12, which is radially spaced from the outer cylinder 11, and a piston 13, which is fixed to a piston shaft 14 and slidable within the inner cylinder 12. The outer cylinder 11 is longer than the inner cylinder 12 and is closed at one end by an end cap assembly 15 and at the other end by a valve assembly 16. The end cap assembly 15 and the valve assembly 16 seat on the respective ends of the inner cylinder 12 and are clamped firmly thereagainst by spinning over the two ends of the outer ends of the outer cylinder 11.

The piston shaft 14 comprises an actuating shaft portion 17 which extends through the cap assembly 15 and has an end-piece 18 adapted for attachment to a seat back, and a dummy shaft portion 19 which extends through the valve assembly 16. The piston 13 comprises a tubular portion 20 and an integral annular flange 21 carrying sealing rings 22, 22a on its opposite faces which make sliding and sealing engagement with the wall of the inner cylinder 12. The actuating portion 17 and dummy portion 19 are threadedly engaged in opposite ends of the tubular portion 20 and seat on a filler plug 23 which is preferably formed from a synthetic resin.

The end cap assembly 15 comprises an outer ring 24 and an inner ring 25 which is externally stepped so as to project into the inner cylinder 12 and formed with a number of radially and axially extending passages 26 which communicate between an annular space 27 formed between the inner and outer cylinders and an annular chamber 28 formed between the piston shaft 14 and the inner cylinder 12. The outer ring 24 is stepped internally and externally at the end adjacent the inner ring 25 so as to provide an internal and external groove adjacent the inter-faces of the two rings. The outer groove holds an O-ring 29 which forms a seal against the outer cylinder 11 and the inner groove holds an O-ring 30 which forms a wiping seal around the actuating shaft portion 17. Both of the O-rings 29 and 30 are of slightly greater diameter than the depth of the grooves so that they are compressed slightly between the inner ring and the outer ring and form a seal therebetween when the end cap assembly is clamped against the inner cylinder 12.

The valve assembly 16 comprises an outer sleeve 31, an inner sleeve 32, a valve actuating lever 33 and a tubular lever retaining plug 34.

The outer sleeve 31 is formed with two oppositely facing external shoulders 35 and 35a, and the end of the outer cylinder 11 is spun over the shoulder 35a so as to clamp the shoulder 35 against the end of the inner cylinder 12 with an end portion 36 of the outer sleeve 31 projecting into the inner cylinder. The wall of the sleeve 31 is formed with two diametrically located radial bores 37, 37a each of which opens into a groove 38, 38a respectively formed in the outer surface of the sleeve and extending axially from the respective bore to the shoulder 35. Spaced angularly by 45° from each bore 37, 37a and axially aligned with the bores is a hole, 39, 39a respectively, the holes 39, 39a being diametrically opposite one another and each housing a plug 40a respectively (see FIGURE 1) of a resilient material, such as a polyvinylchloride or an elastomeric rubber, and which normally projects slightly into the bore of the outer sleeve so as to be compressed between the inner sleeve 32 and the outer cylinder 11. An end portion 41 of the outer sleeve projects beyond the end of the outer cylinder 11 and is formed with an arcuate cut out 42 adapted to accommodate a lug on the lever 33 so as to allow rotation of the lever 33 and inner sleeve 32 through an angle of 45° relative to the outer sleeve 31. Intermediate the shoulder 35a and the bores 37, 37a the sleeve 31 has a circumferential groove 43 which accommodates the ends of two pivot pins 44, 44a. The pivot pins 44, 44a are rigidly attached to a fixed support 61 and pass through apertures in the outer cylinder 11 so that the outer cylinder and thus the whole locking device 10 can pivot on the pins 44, 44a with respect to the support 61. Between the groove 43 and the bores 37, 37a the sleeve 31 is formed with a second circumferential groove housing an O-ring 45 which is compressed in sealing engagement against the outer cylinder 11.

The inner sleeve 32 is a sliding fit in the outer sleeve 31 and the dummy shaft portion 19 is a sliding fit through the inner sleeve. A shoulder 46 is formed at one end of the inner sleeve, to prevent the inner sleeve from passing through the outer sleeve, and the other end of the inner sleeve projects from the outer sleeve to form a shaft portion 47 which carries the lever 33. At a position along the length of the inner sleeve 32 which corresponds to the position of the bores 37, 37a in the outer sleeve 31 are two diametrically positioned radial apertures 48, 48a. Between the apertures 48, 48a and the end of the inner sleeve which projects into the inner cylinder 12 the internal diameter of the inner sleeve is slightly greater than the diameter of the dummy shaft 19 so as to form an annular flow passage 49 (see FIGURE 1) communicating between an annular chamber 50 located between the piston 13 and the valve assembly 16 and the apertures 48, 48a. On each side of the apertures 48, 48a the inner sleeve 32 is formed with circumferential grooves housing O-rings 51, 51a which seal against the outer sleeve 31. The internal diameter of the shaft portion 47 of the inner sleeve 32 is stepped outwardly to accommodate the tubular plug 34.

The lever 33 has a bearing portion 52, which is keyed on to the shaft portion 47, and an axially extending lug 53 projecting into the arcuate cut-out 42, the length of which is such that rotation of the lever 33 and inner sleeve 32 relative to the outer sleeve 31 is limited to an angle of 45°. The lever 33 is held on the shaft portion by the tubular plug 34 which is formed with a series of circumferential serrations 54 and is a tight friction fit in the shaft portion 47 of the inner sleeve 32. An O-ring is held between the plug 34 and an internal shoulder of the inner sleeve and forms a wiping seal around the dummy shaft portion 19.

Two coil springs 55 and 56 surround the actuating shaft portion 17. The springs 55 and 56 are housed between spring caps 57 and 58 and are tensioned to urge the piston 13 permanently away from the valve assembly 16.

Movement of the piston 13 in a direction away from the valve assembly 16 is limited by an end stop 59 attached to the dummy shaft portion 19 and movement of the piston 13 in the opposite direction is limited by a synthetic plastics sheath 60 which is located around the shaft portion 17 between the spring caps 57 and 58. The length of the sheath 60 is so arranged that it prevents movement of the spring cap 57 towards the spring cap 58 beyond the point at which the springs 55 and 56 would become over-compressed and the position of the piston 13 on the shaft 17, 19 is such that when the limit point is reached in this direction the piston 13 is spaced a short distance from the end of the inner sleeve 32.

As shown in FIGURE 2, the outer cylinder 11 is pivoted to a fixed support 61 by the pivot pins 44, 44a and a spring return mechanism 62 is provided which ensures that the lever 33 is normally held in a predetermined angular position relative to the outer cylinder 11 and the outer sleeve 31.

The spring return mechanism comprises a rod 63, which is yoke-shaped at its upper end 64 and pivoted to the lever 33. The other end 65 of the rod 63 projects downwardly through an aperture 65 in a part of the fixed support 61. A compression spring 66 is located around the rod 63 between the end 64 of the rod and the fixed support 61. The spring 66 is under permanent compression and normally urges the lever upwardly into the limit of the angular movement allowed by the engagement of the lug 53 in the cut out 42 of the outer sleeve 31.

In use, as shown diagrammatically in FIGURE 9, the fixed support 61, to which the outer cylinder is pivoted by the pins 44, 44a, is formed integrally with a fixed seat frame 67 and the end piece 18 of the shaft portion 17 is pivotally attached to a back frame 68 on a radius from and below the point at which the back frame 68 is pivoted to the seat frame 67.

When the piston 13 is in the limit position shown in FIGURE 1, that is with the piston at the right hand end of the inner cylinder 12 and adjacent the valve assembly 16, the back frame 68 is in an inclined position relative to the seat and movement of the back frame 68 towards an upright position moves the piston to the left and away from the valve assembly.

The lever 33 and thus the inner sleeve 32 are normally held by the spring return mechanism 62 in such a position relative to the outer sleeve 31 that the apertures 48, 48a in the inner sleeve are aligned with and closed by the resilient plugs 40a in the outer sleeve 31 and flow of fluid from the annular gap 27 to the annular chamber 50 is prevented. Consequently, when the lever 33 is in the position shown in full line in FIGURE 2, the piston 13 and thereby the back frame 68 are locked in position.

If the lever 33 is now depressed, against the action of the spring 66 and rotated through the 45° angle allowed by the length of the cut out 42 in the outer sleeve 31, the apertures 48, 48a are rotated into alignment with the bores 37, 37a thus forming a continuous passage for the flow of fluid from the chamber 28 on one side of the piston 13, via the passages 26, annular gap 27, grooves 38, 38a, bores 37, 37a, apertures 48, 48a and annular flow passage 49 to the chamber 50. The piston is then free to move in either direction within the cylinder 12 and the back frame 68 can be angularly adjusted relative to the seat frame 67. When the back frame 68 is in its new position the lever 33 is released, the lever 33 and inner sleeve 32 are rotated back to the full line position shown in FIGURE 2 and the piston 13 is locked in position thereby also locking the back frame 68 relative to the seat frame 67 in its new position.

If the lever 33 is depressed so as to release the piston 13 and no external pressure is applied to the back frame 68 the springs 55 and 56 will automatically extend the shaft 17 and move the back frame 68 into the upright position.

It will be appreciated that the locking device 10, although illustrated and described herein to give infinitely adjustable movement to the back of a vehicle seat, can be used for many other purposes, for instance it can be adapted to control the position of any two relatively movable members and is not to be taken as limited for use only on vehicle seats.

The locking device 10 is preferably filled with oil but any other fluid, either a gas or a liquid may be used if preferred. In order to fill the locking device 10 with, for instance, oil, the piston is moved towards the valve assembly 16 to the full extent, oil is then poured into the chamber 28 so as to fill both the chamber 28 and the annular gap 27 between the inner and outer cylinders and the end cap assembly 15 is assembled over the open end of the cylinder 11. It will be seen that a very small air gap will be left in the chamber 50 during the filling operation but this is reduced sufficiently to ensure that it has no appreciable effect on the efficiency of the locking action.

Further modifications may be made to the locking device illustrated herein without departing from the scope and spirit of the invention which is defined in the following claims:

What we claim is:

1. A locking device in the form of a piston and cylinder assembly comprising an inner cylinder which is closed at both ends, an outer cylinder co-axially surrounding said inner cylinder and spaced therefrom to form an annular gap therebetween, a piston mounted on a shaft which extends through the length of the cylinders, the piston being slidable within the inner cylinder and dividing said inner cylinder into a first fluid chamber located on one side of the piston and a second fluid chamber located on the other side of the piston, fluid conduit means formed in part by said gap permanently communicating with the first chamber at one end of the inner cylinder and in valve-controlled communication with the second chamber at the other end of the inner cylinder, said valve being placed axially from the piston and comprising an outer sleeve fixedly attached in one end of the outer cylinder, an inner sleeve acting as a bearing for the piston shaft housed in said outer sleeve and rotatable relative thereto, said conduit extending through the outer sleeve and the inner sleeve and being open when the inner sleeve is in one predetermined angular position relative to the outer sleeve and otherwise closable by rotation of the inner sleeve relative to the outer sleeve away from said predetermined position so as to control movement of the piston along the cylinder, and a valve actuating member located externally of the piston shaft and mounted for rotation about the axis of the piston shaft to rotate said inner sleeve.

2. A locking device as claimed in claim 1, in which the inner sleeve projects from the outer cylinder and is non-rotatably keyed to a manually operable lever.

3. A locking device as claimed in claim 2, in which the inner sleeve is permanently biassed in a direction to close the said fluid conduit.

4. A piston and cylinder assembly comprising an inner cylinder and an outer cylinder which is co-axial with and radially spaced from the inner cylinder, a piston slidable within the inner cylinder and mounted on a piston shaft extending through and spaced from the inner cylinder, a closure at one end of the outer cylinder which acts as a bearing for the piston shaft and locates the inner and outer cylinders, the closure being provided with fluid passages communicating between the inner cylinder and the outer cylinder, a valve assembly at the opposite end of the outer cylinder to the said closure, the valve assembly comprising an outer sleeve which closes the said other end of the outer cylinder and an inner sleeve which acts as a bearing for the shaft, the inner sleeve and the outer sleeve being relatively rotatable and there being provided a fluid conduit through the valve assembly communicating between the inner cylinder and the outer cylinder, the arrangement being such that in one position of the inner sleeve relative to the outer sleeve the said fluid conduit is closed and movement of the piston within the inner cylinder is prevented and such that the inner sleeve can be rotated relative to the outer sleeve away from the said one position to open the said fluid conduit and allow fluid to flow between the inner cylinder and the outer cylinder in response to movement of the piston.

References Cited

UNITED STATES PATENTS

| 2,010,496 | 8/1935 | Peters et al. | 188—94 X |
| 2,628,662 | 2/1953 | Morris et al. | 188—94 X |
| 2,630,887 | 3/1953 | Paquin. | |
| 2,827,186 | 3/1958 | Waite. | |
| 2,897,613 | 8/1959 | Davidson et al. | |
| 2,922,497 | 1/1960 | Porter. | |

FOREIGN PATENTS 695,308    9/1930    France.

MILTON BUCHLER, *Primary Examiner.*

G. E. A. HALVOSA, *Assistant Examiner.*